(12) United States Patent
Liu

(10) Patent No.: US 12,364,257 B1
(45) Date of Patent: Jul. 22, 2025

(54) TELESCOPIC MULTIFUNCTIONAL MOSQUITO KILLING LAMP

(71) Applicant: Yao Liu, Chenzhou (CN)

(72) Inventor: Yao Liu, Chenzhou (CN)

( * ) Notice: Subject to any disclaimer, the term of this patent is extended or adjusted under 35 U.S.C. 154(b) by 0 days.

(21) Appl. No.: 19/019,645

(22) Filed: Jan. 14, 2025

(51) Int. Cl.
*A01M 1/04* (2006.01)
*A01M 1/22* (2006.01)

(52) U.S. Cl.
CPC .............. *A01M 1/223* (2013.01); *A01M 1/04* (2013.01)

(58) Field of Classification Search
CPC ................................. A01M 1/04; A01M 1/223
USPC ..................................................... 43/112, 113
See application file for complete search history.

(56) References Cited

U.S. PATENT DOCUMENTS

| | | | | |
|---|---|---|---|---|
| 8,109,036 | B1* | 2/2012 | Wilbanks | A01M 1/223 43/112 |
| 11,603,970 | B1* | 3/2023 | Rajasekaran | A01M 1/04 |
| 12,207,641 | B1* | 1/2025 | He | A01M 1/04 |
| 2009/0038207 | A1* | 2/2009 | Lin | A01M 1/04 43/112 |
| 2014/0268679 | A1* | 9/2014 | Huang | A01M 1/04 362/101 |
| 2018/0271080 | A1* | 9/2018 | Kim | F21V 7/0091 |
| 2021/0368764 | A1* | 12/2021 | Horne | A01M 1/106 |
| 2022/0110308 | A1* | 4/2022 | Sabic | A01M 1/223 |
| 2022/0386586 | A1* | 12/2022 | Cran | A01M 1/04 |
| 2023/0104986 | A1* | 4/2023 | Perlman | A01M 1/04 43/107 |
| 2023/0284605 | A1* | 9/2023 | Rubel | A01M 1/04 |
| 2023/0292727 | A1* | 9/2023 | Zheng | A01M 1/04 43/112 |
| 2023/0292728 | A1* | 9/2023 | Zheng | A01M 1/04 43/112 |
| 2023/0292731 | A1* | 9/2023 | Zheng | A01M 1/223 43/112 |
| 2023/0329213 | A1* | 10/2023 | Zheng | A01M 1/08 |
| 2023/0329214 | A1* | 10/2023 | Zheng | A01M 1/145 |
| 2023/0329215 | A1* | 10/2023 | Zheng | A01M 1/04 |
| 2025/0049019 | A1* | 2/2025 | Li | A01M 1/223 |

FOREIGN PATENT DOCUMENTS

| | | | |
|---|---|---|---|
| CN | 104068003 | A * | 10/2014 |
| CN | 204707806 | U * | 10/2015 |
| CN | 106605640 | A * | 5/2017 |
| CN | 207334349 | U * | 5/2018 |

(Continued)

*Primary Examiner* — Darren W Ark
(74) *Attorney, Agent, or Firm* — JEEN IP LAW, LLC

(57) ABSTRACT

A telescopic multifunctional mosquito killing lamp is provided, which includes a base, a mosquito killing module, and a lamp. The mosquito killing module is provided on the base, the lamp is provided on one end of a telescopic rod. The other end of the telescopic rod runs through the mosquito killing module and is connected to the base; the base is provided with a battery and a PCB board, the mosquito killing module includes a shielding cover, a power grid and a UV light source. The lamp is provided with a lamp board with light beads, and the PCB board is electrically connected to the battery, the power grid, the UV light source, and the lamp board. The lamp uses the telescopic rod and a T-shaped swivel head, the lamp can be extended and rotated for lighting and stored on a top of the shielding cover.

7 Claims, 6 Drawing Sheets

(56) References Cited

FOREIGN PATENT DOCUMENTS

| | | | | |
|---|---|---|---|---|
| CN | 208016760 U | * | 10/2018 | |
| CN | 109699331 A | * | 5/2019 | |
| CN | 209693532 U | * | 11/2019 | |
| CN | 210203020 U | * | 3/2020 | |
| CN | 210226627 U | * | 4/2020 | A01M 1/02 |
| CN | 210226640 U | * | 4/2020 | |
| CN | 211153445 U | * | 8/2020 | |
| CN | 111878753 A | * | 11/2020 | |
| CN | 212164669 U | * | 12/2020 | |
| CN | 212434159 U | * | 1/2021 | |
| CN | 213207646 U | * | 5/2021 | |
| CN | 213272267 U | * | 5/2021 | |
| CN | 213463545 U | * | 6/2021 | A01M 1/04 |
| CN | 213663251 U | * | 7/2021 | |
| CN | 213848349 U | * | 8/2021 | |
| CN | 213881469 U | * | 8/2021 | |
| CN | 214155938 U | * | 9/2021 | |
| CN | 214257709 U | * | 9/2021 | |
| CN | 214369801 U | * | 10/2021 | |
| CN | 214593752 U | * | 11/2021 | |
| CN | 113757608 A | * | 12/2021 | |
| CN | 214962137 U | * | 12/2021 | |
| CN | 215523124 U | * | 1/2022 | |
| CN | 215570242 U | * | 1/2022 | |
| CN | 215602744 U | * | 1/2022 | |
| CN | 215602774 U | * | 1/2022 | |
| CN | 215636868 U | * | 1/2022 | |
| CN | 215957898 U | * | 3/2022 | |
| CN | 114431205 A | * | 5/2022 | |
| CN | 216492954 U | * | 5/2022 | |
| CN | 216715909 U | * | 6/2022 | |
| CN | 216853538 U | * | 7/2022 | |
| CN | 217117313 U | * | 8/2022 | |
| CN | 217117315 U | * | 8/2022 | |
| CN | 217184506 U | * | 8/2022 | |
| CN | 217446328 U | * | 9/2022 | |
| CN | 221634817 U | * | 9/2024 | |
| GB | 2568602 B | * | 12/2022 | A01M 1/04 |

* cited by examiner

TELESCOPIC MULTIFUNCTIONAL MOSQUITO KILLING LAMP

TECHNICAL FIELD

The present disclosure relates to the field of mosquito killing lamp technologies, and in particular, to a telescopic multifunctional mosquito killing lamp.

BACKGROUND

Traditional mosquito killing lamps have been in the market for many years, but they often face some limitations and shortcomings. For example, most mosquito killing lamps require plugging in, which not only limits the usage scenarios (such as outdoor activities, camping, etc.), but also increases the complexity and inconvenience of installation. Besides that, some mosquito killing devices use chemicals to attract or kill insects, which may cause environmental pollution and pose potential risks to human health. With the increasing awareness of environmental protection and the growing demand for quality of life, there is a growing demand in the market for mosquito killing lamps that do not require wire connections, are safe, environmentally friendly, and easy to carry.

In recent years, with the advancement of electronic technology and materials science, various improved mosquito killing lamps have emerged. However, existing solutions still have some issues.

Power dependence: many portable mosquito killing lamps have built-in batteries, but the charging interface design is unreasonable, or the battery life is limited, which leads to a user to frequently search for chargers and sockets.

Single functionality: most products only have mosquito killing function and lack other practical features, such as lighting function, which cannot meet diverse needs of the user in different scenarios.

Unreasonable structural design: some products have insufficiently compact structures, unstable connections between components, and are prone to damage during transportation or use; furthermore, some products have complex operating interfaces that are not easy for the elderly or children to use.

Insufficient safety: some mosquito killing lamps have not fully considered factors such as fire resistance, rain resistance, water resistance, and oxidation resistance, which leads to a short service life and potential safety hazards.

Therefore, it is particularly important to develop a multifunctional mosquito killing lamp that integrates efficient mosquito control and high-quality lighting.

SUMMARY

In view of this, the present disclosure provides a telescopic multifunctional mosquito killing lamp, aiming to provide a mosquito killing lamp that can be charged, telescopic and adjustable for lighting, and is suitable for indoor and outdoor use. The telescopic multifunctional mosquito killing lamp includes a base, a mosquito killing module, and a lamp. The mosquito killing module is provided on the base, the lamp is provided on one end of a telescopic rod, the other end of the telescopic rod runs through the mosquito killing module and is connected to the base; the base is provided with a battery and a PCB board inside; the mosquito killing module includes a shielding cover, a power grid, and a UV light source; the lamp is provided with a lamp board with light beads inside; the PCB board is electrically connected to the battery, the power grid, the UV light source, and the lamp board. This mosquito killer lamp can achieve functions of mosquito killing and lighting.

In some embodiments of the present disclosure, an interior of the base is provided with a storage compartment configured to fix the battery and the PCB board; the storage compartment is further provided with a fixing plate configured to fix the battery and the PCB board, and a bottom of the base is provided with a bottom cover connected by a bayonet.

In some embodiments of the present disclosure, the PCB board is provided with a microcontroller, a TYPE-C charging port, a button, and an indicator light, thereby solving a problem of traditional mosquito killing lamp relies on fixed power sockets, which greatly improves the flexibility and convenience of use.

In some embodiments of the present disclosure, a bottom of the shielding cover is clamped to a top of the base, a top of the shielding cover is clamped to a middle cover, and the middle cover is clamped to a telescopic rod positioning cover, a top of the power grid is fixed to the telescopic rod positioning cover; a center of the telescopic rod positioning cover is provided with a through hole configured to position the telescopic rod, and the through hole is provided with a protrusion; two sides of the telescopic rod are provided with slots that match the protrusion to ensure that the lamp is extended and retracted in a straight line. The shielding cover is made of flame-retardant ABS and refractory materials, which have the characteristics of fire resistance, rain resistance, water resistance, and oxidation resistance, thereby extending the service life of the product.

In some embodiments of the present disclosure, one end of the telescopic rod that is located at the lamp is provided with a T-shaped swivel head, and the T-shaped swivel head is rotatably connected to a lampshade of the lamp; the lampshade is provided with a second through groove configured to accommodate the telescopic rod, a top of the lampshade is further clamped with a top cover. This technology can adjust a lighting angle of the lamp.

In some embodiments of the present disclosure, two sides of the T-shaped swivel head are provided with two first through grooves configured for power supply lines to pass through, the first through grooves fix the power supply lines through a pressing piece, the T-shaped swivel head abuts against a shaft hole of the lampshade through a fixing piece.

In some embodiments of the present disclosure, a wavelength range of an UVA band of the UV light source is 320-400 nanometers, and many types of mosquitoes have highest visual sensitivity around this wavelength. By using physical principles to attract and eliminate mosquitoes, the use of chemical agents is avoided, which ensures environmental friendliness and human safety.

In some embodiments of the present disclosure, the base is further provided with a photosensitive sensor, and the photosensitive sensor is electrically connected to the PCB board. The photosensitive sensor can monitor changes in the surrounding environment's light intensity in real time, and automatically turn on the lighting or mosquito killing function when dark is detected, thereby saving energy and improving the user experience.

Compared with existing technologies, the present disclosure has the following beneficial effects.

Built in rechargeable lithium battery and the TYPE-C fast charging interface solve a problem of traditional mosquito killing lamps relying on fixed power sockets, greatly improving the flexibility and convenience of use.

A combination of mosquito killing function and efficient LED lighting forms a two in one product. Switching between a lighting mode, a mosquito killing mode, and a combination mode can be achieved through simple button switching, thereby providing sufficient light at night and effectively killing mosquitoes, when necessary, and providing a user with a comprehensive service experience.

Intelligent control is achieved through the photosensitive sensor and the microcontroller, which can automatically adjust the brightness of the lamp according to the ambient light intensity, automatically turn on the lighting function or mosquito killing function, thereby further simplifying the use's operation process.

The lamp adopts the telescopic rod and the T-shaped swivel head, which can be extended and rotated for lighting, and can be stored on the top of the shielding cover when not in use.

The overall design adopts a modular concept, each component is tightly connected through precision buckles, threads, or other forms of quick connectors, thereby ensuring the stability and durability of the overall structure. Especially the design of the telescopic rod allows the user to flexibly adjust the height of the lamp according to an actual need, thereby enhancing a convenience of use and expanding an application scope.

BRIEF DESCRIPTION OF DRAWINGS

In order to provide a clearer explanation of the technical solution in the embodiments of the present disclosure, a brief introduction will be given to the drawings required for the description of the embodiments. It is obvious that the drawings described below are only some embodiments of the present disclosure. For those skilled in the art, other drawings can be obtained based on these drawings without creative work.

Figure 1:
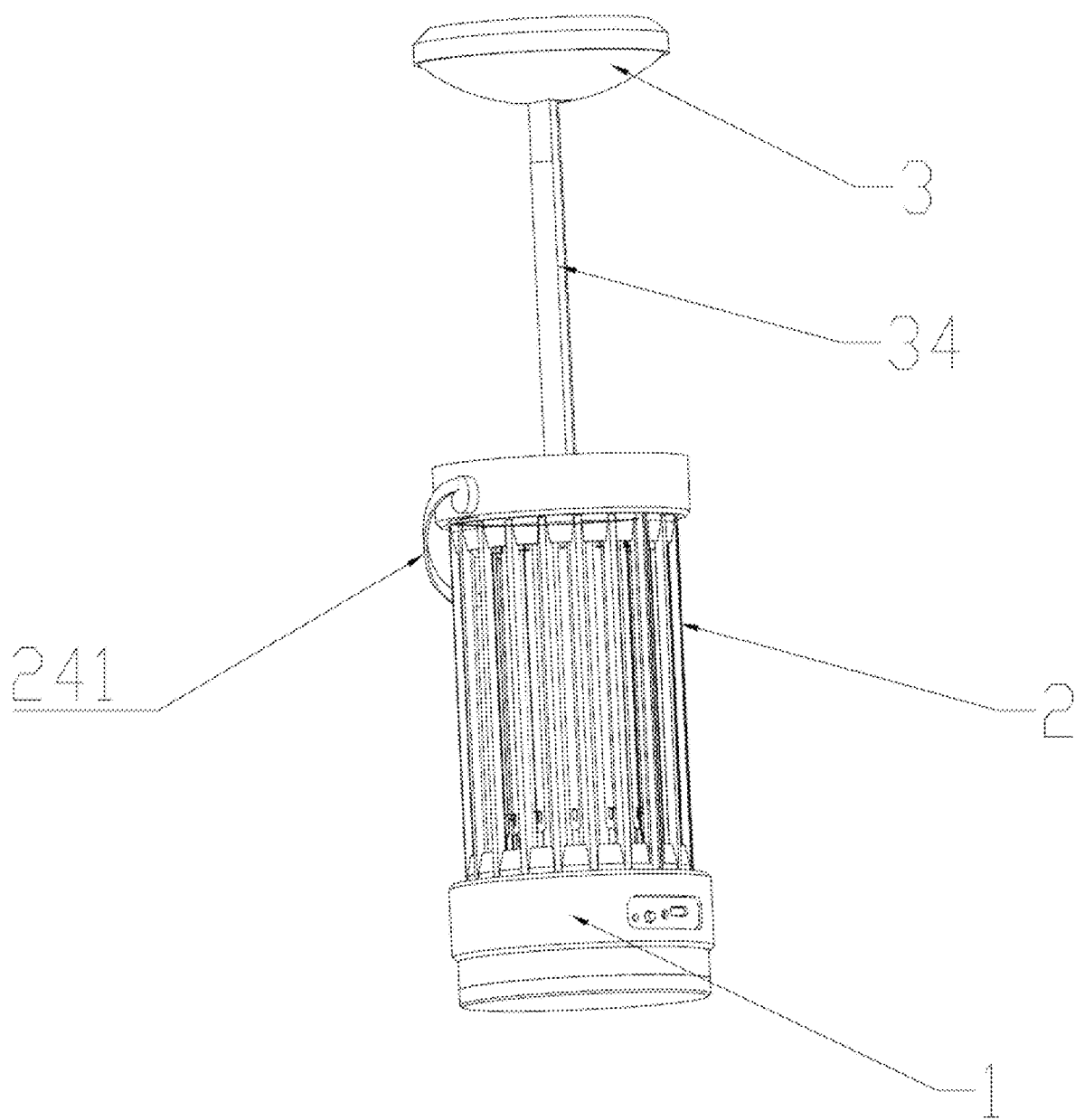
FIG. 1 is an overall schematic diagram provided by an embodiment of the present disclosure.

Numeral reference: 1—base; 11—bottom cover; 12—fixing plate; 13—battery; 14—PCB board; 101—storage compartment; 2—mosquito killing module; 21—shielding cover; 22—power grid; 23—UV light source; 24—middle cover; 241—handle; 25—telescopic rod positioning cover; 3—lamp; 31—lamp board; 32—lampshade; 321—first through groove; 322 T-shaped swivel head; 323—fixing piece; 324—pressing piece; 325—second through groove; 33—top cover; 34—telescopic rod.

Through the above drawings, clear embodiments of the present disclosure have been shown, which will be described in more detail in the following description. These drawings and textual descriptions are not intended to limit the scope of the present disclosure in any way, but rather to illustrate the concept of the present disclosure for those skilled in the art by referring to specific embodiments.

DESCRIPTION OF EMBODIMENTS

The following will provide a clear and complete description of the technical solution in the embodiments of the present disclosure, combined with the accompanying drawings. Obviously, the described embodiments are a part of the embodiments of the present disclosure, not all of them. Based on the embodiments in the present disclosure, all other embodiments obtained by those skilled in the art without creative work are within the protection scope of the present disclosure.

In order to clarify the technical solution and advantages of the present disclosure, a further detailed description of the embodiments of the present disclosure will be provided below in combination with the accompanying drawings.

A design of a telescopic multifunctional mosquito killing lamp of the present disclosure aims to provide a device that integrates efficient mosquito killing and intelligent lighting function, while ensuring structural stability and flexibility of use through modular design. This product solves a problem of traditional mosquito killing lamps relying on fixed power sockets, and achieves intelligent control through a built-in lithium battery, a TYPE-C fast charging interface, a photosensitive sensor, and a microcontroller.

Please refer to FIGS. 1-6. A base 1 serves as a foundation of an entire device and is provided with a storage compartment 101 configured to accommodate a battery 13 and a PCB (Printed Circuit Board) board 14, as well as a fixing plate 12 to stabilize these components. A bottom of the base 1 is provided with a bottom cover 11 connected by a bayonet, which is easy to disassemble and maintain. The PCB board 14 integrates the microcontroller, the TYPE-C charging port, a button, and an indicator light to achieve intelligent control and operation prompts for the mosquito killing lamp. A UV light source 23 selects an UVA band around 320-400 nanometers to attract and eliminate mosquitoes and insects through a power grid 22. The base 1 is further provided with the photosensitive sensor that can automatically turn on or off corresponding functions according to surrounding environment's light intensity.

A mosquito killing module 2 is provided on the base 1, consisting of a shielding cover 21, a power grid 22, and the UV light source 23 from an outside to an inside. The shielding cover 21 is made of flame-retardant ABS (Acrylonitrile Butadiene Styrene plastic) and fire-resistant materials. A bottom of the shielding cover 21 is clamped with a top of the base 1, and a top of the shielding cover 21 is connected to a middle cover 24, and the middle cover 24 is connected to a telescopic rod positioning cover 25. A top of the power grid 22 is fixed on the telescopic rod positioning cover 25, and a through hole on it has a protrusion that matches slots on two sides of a telescopic rod 34, ensuring that the lamp 3 is extended and retracted in a straight line.

Figure 2:
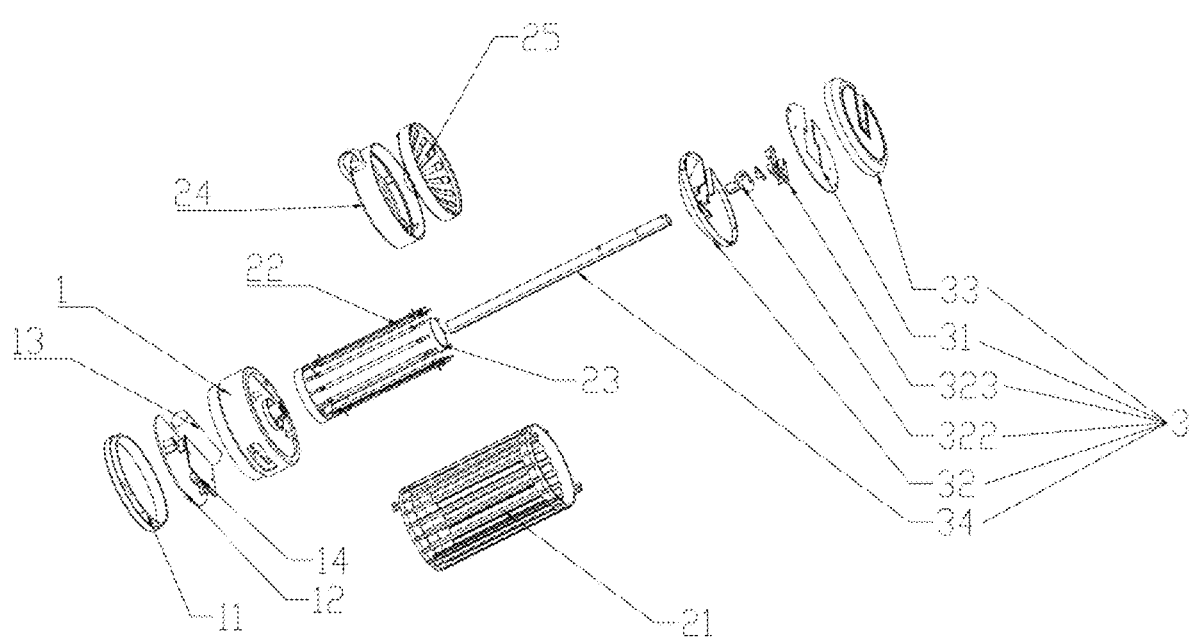
FIG. 2 is an explosion schematic diagram provided by an embodiment of the present disclosure.
Figure 3:
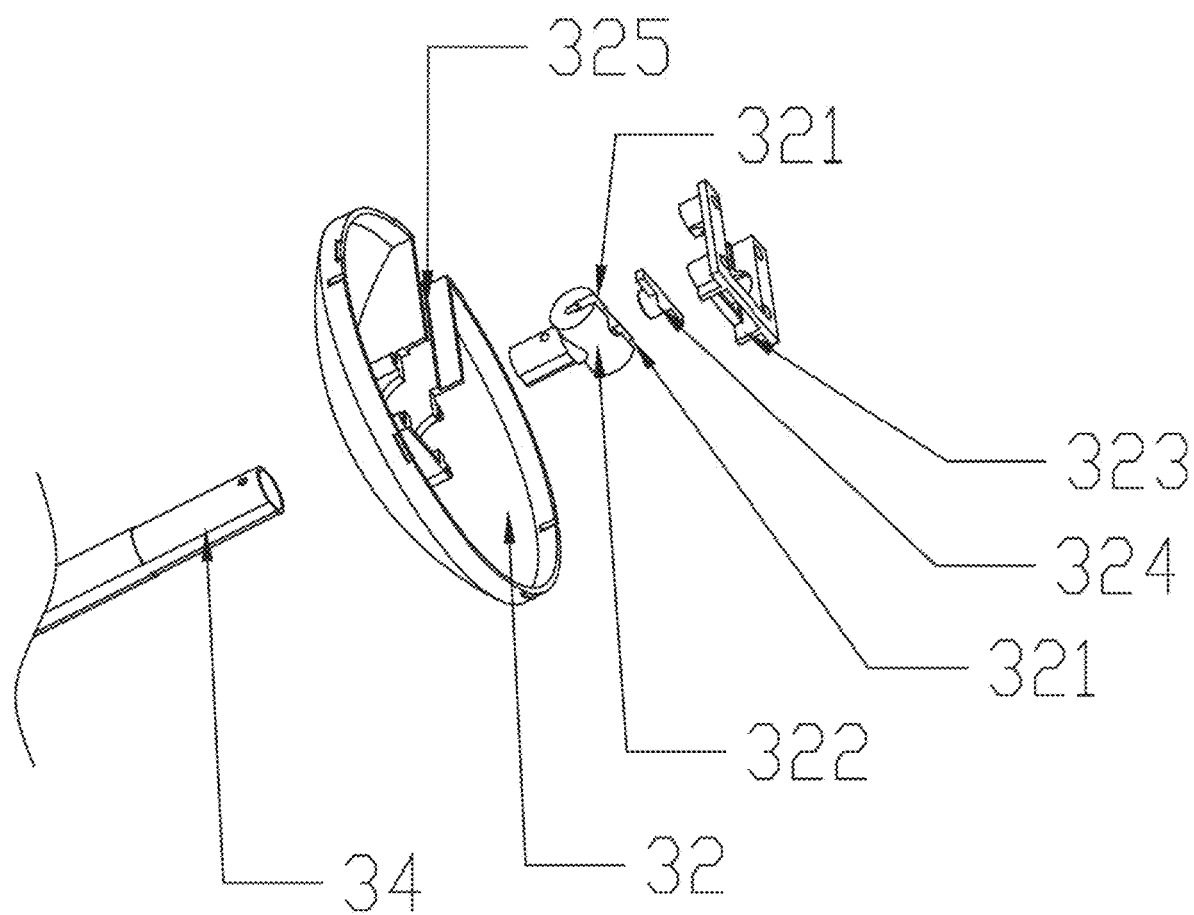
FIG. 3 is a schematic diagram of an internal structure of a lamp provided in an embodiment of the present disclosure.
Figure 4:
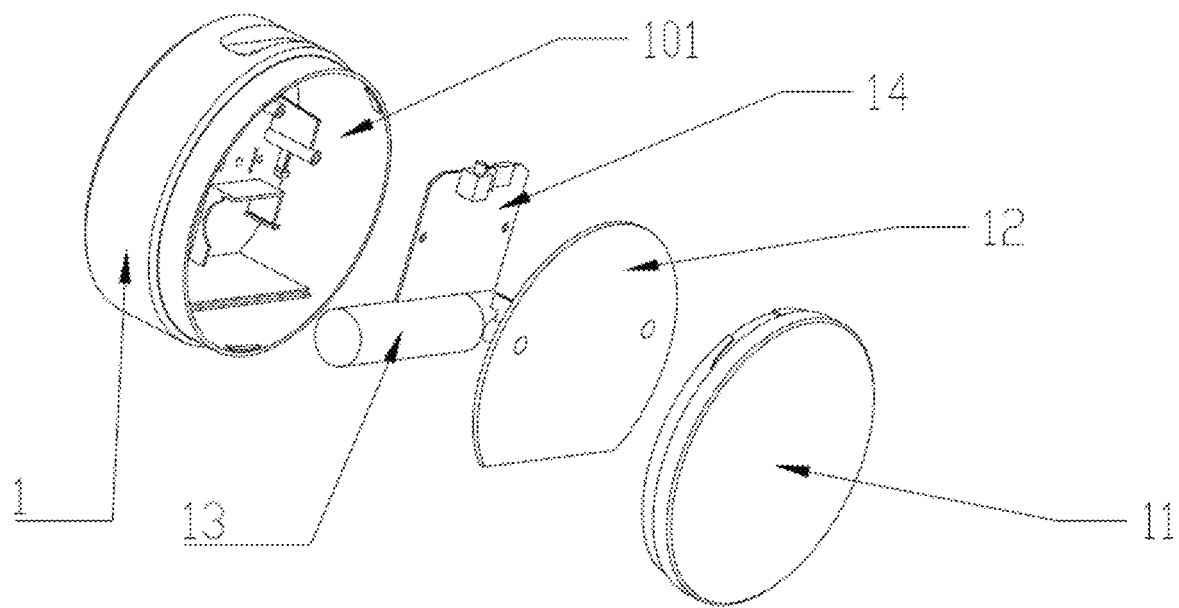
FIG. 4 is a schematic structural diagram of a base provided in an embodiment of the present disclosure.

As shown in FIG. 2, the lamp 3 is provided at one end of the telescopic pole 34, and there is a lamp board 31 with LED beads inside the lamp 3. The other end of the telescopic rod 34 runs through the mosquito killing module 2 and is connected to the base 1. The lamp 3 is provided with a T-shaped swivel head 322 at one end, allowing the lamp 3 to rotate and adjust a lighting angle; a top of the lampshade 32 is connected to a top cover 33. As shown in FIG. 3, there are first through grooves 321 on two sides of the T-shaped swivel head 322 for power supply wires to pass through. The first through grooves 321 fix the wires through pressing piece 324, and the T-shaped swivel head 322 abuts against a shaft hole of the lampshade 32 through the fixing piece 323; and the lampshade 32 is provided with a second through groove 325 configured to accommodate the telescopic rod 34.

In order to have a more thorough and comprehensive understanding of the disclosed content of the present disclosure, the principle will be further explained in combination with its usage mode.

A user only needs to place the mosquito killing lamp in a desired location, the built-in battery 13 is charged through the TYPE-C interface, and then it can be used. The button on the PCB board 14 is pressed to select a desired mode. The photosensitive sensor will automatically adjust its working state according to the surrounding environment's light intensity.

Figure 5:
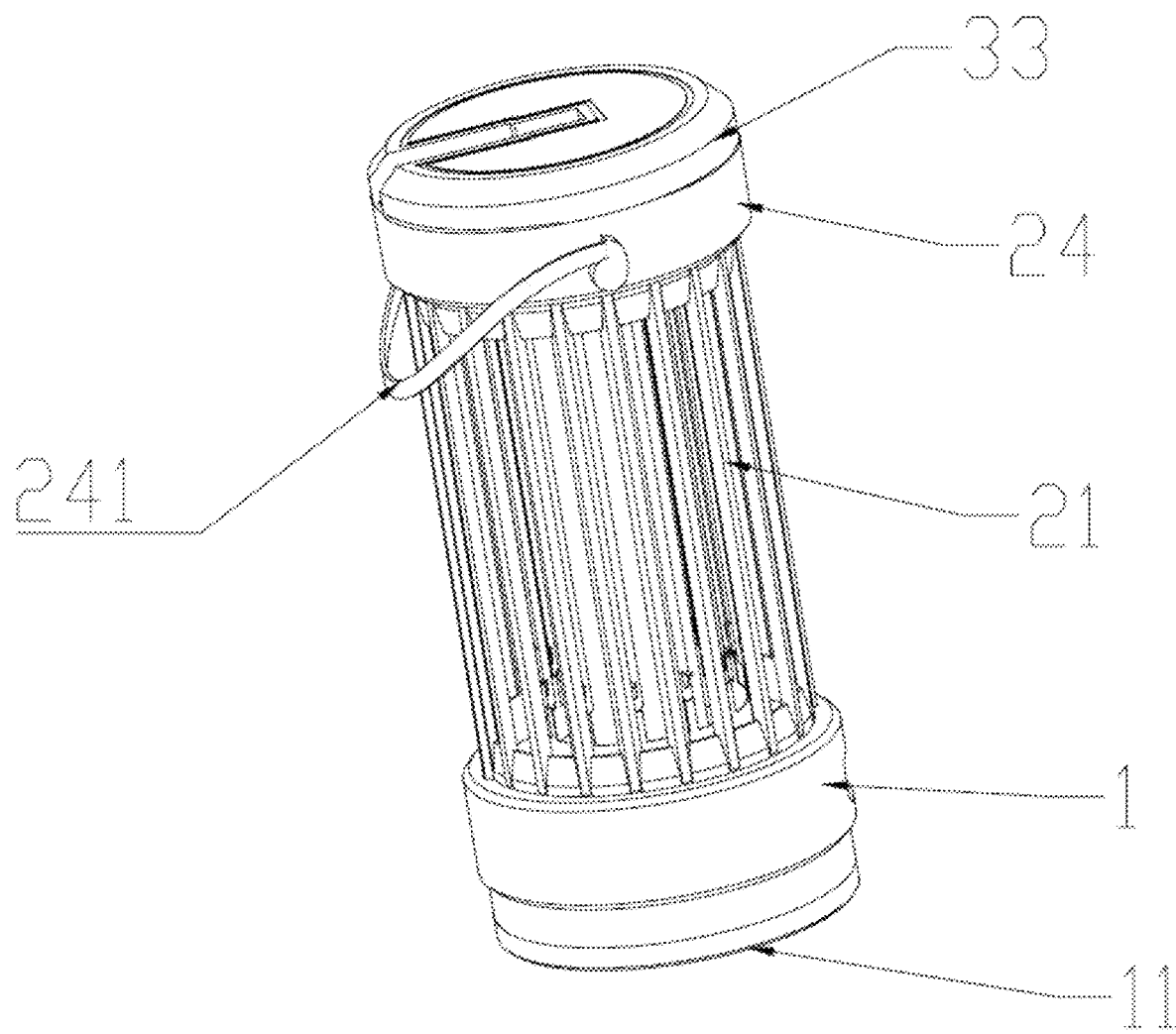
FIGS. 5 and 6 are usage diagrams provided in embodiments of the present disclosure.
Figure 6:
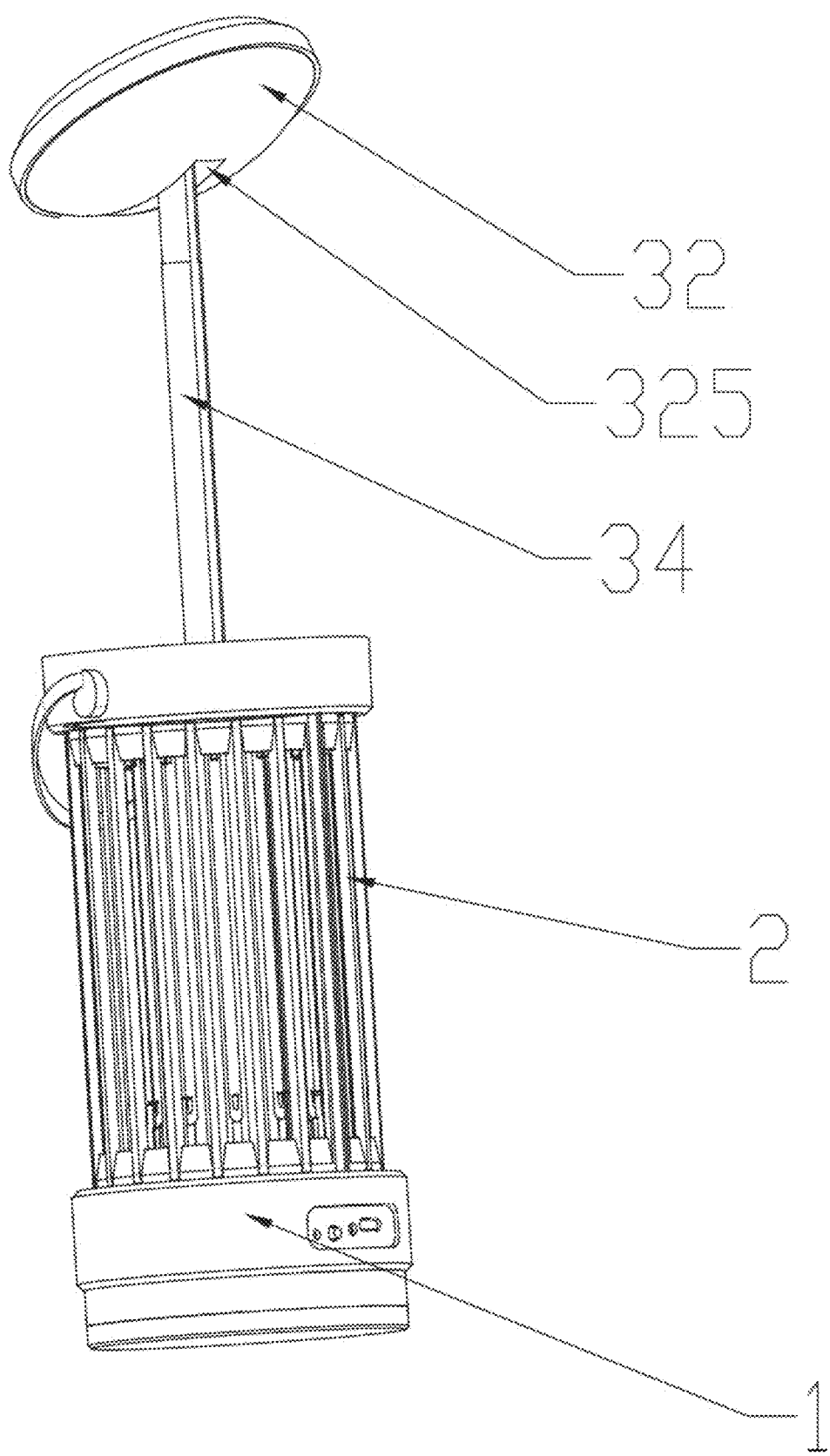

As shown in FIGS. 1 and 6, when lighting is required, the lamp 3 can be pulled out through the telescopic rod 34. When adjusting a height or lighting angle of the lamp 3, it can be rotated to an appropriate position with the T-shaped swivel head 322. In non-illuminated mode, as shown in FIG. 5, the mosquito killing lamp can be easily lifted away with a handle 241.

This mosquito killing lamp has multiple working modes:
1. Lighting mode: pressing a power switch for a first time; the lamp independently works.
2. Mosquito killing mode: pressing the power switch for a second time; the UV light source 23 and the power grid 22 work.
3. Lighting and Mosquito Control: pressing the power switch for a third time; the lamp, the UV light source 23, and the power grid work together.
4. Off mode: pressing the power switch for a fourth time; the lamp, the UV light source 23, and the power grid 22 will not work.

The product is charged using a TYPE-C external power supply with DC 5V. The charging indicator light displays a red light when the battery is not fully charged; when the battery is fully charged, a blue light is displayed.

It is necessary to regularly clean the mosquito debris inside the power grid 22 and a machine body. Normally, it should be cleaned once a week. When the mosquito catch is large, the cleaning frequency is needed to increase. Before cleaning the product, ensure that it is in the off mode.

Those skilled in the art will easily think off other embodiments of the present disclosure after considering the specification and practicing the present disclosure. The present application aims to cover any variations, uses, or adaptive changes of the present disclosure, which follow the general principles of the present disclosure and include common knowledge or customary technical means in the technical field not disclosed in the present disclosure. The specification and embodiments are only considered exemplary, and the true scope and spirit of the present disclosure are indicated by the claims above.

It should be noted that when a component is referred to as "fixed to" another component, it can be directly on the other component or there can also be a centered component. When a component is considered to be "connected" to another component, it can be directly connected to another component or there may be a central component present at the same time. On the contrary, when a component is referred to as "directly on" another component, there is no intermediate component. Terms "vertical", "horizontal", "left", "right" and similar expressions used in this specification are for illustrative purposes only and do not represent the only implementation mode. Terms "upper", "lower", "left", "right", "front", "rear" and similar expressions used in this specification are based on a positional relationship in the reference drawings.

It should be understood that the present disclosure is not limited to the precise structure described above and shown in the accompanying drawings, and various modifications and changes can be made without departing from its scope. The scope of the present disclosure is limited only by the appended claims.

What is claimed is:

1. A telescopic multifunctional mosquito killing lamp, comprising a base, a mosquito killing module, and a lamp;
   the mosquito killing module is provided on the base,
   the lamp is provided on one end of a telescopic rod, an other end of the telescopic rod runs through the mosquito killing module and is connected to the base;
   the base is provided with a battery and a PCB board inside;
   the mosquito killing module comprises a shielding cover, a power grid, and a UV light source;
   the lamp is provided with a lamp board with light beads inside;
   the PCB board is electrically connected to the battery, the power grid, the UV light source, and the lamp board;
   wherein a bottom of the shielding cover is clamped to a top of the base,
   a top of the shielding cover is clamped to a middle cover, and the middle cover is clamped to a telescopic rod positioning cover,
   a top of the power grid is fixed to the telescopic rod positioning cover;
   a center of the telescopic rod positioning cover is provided with a through hole configured to position the telescopic rod, and the through hole is provided with a protrusion;
   two sides of the telescopic rod are provided with slots that match the protrusion.

2. The telescopic multifunctional mosquito killing lamp according to claim 1, wherein an interior of the base is provided with a storage compartment configured to fix the battery and the PCB board;
   the storage compartment is further provided with a fixing plate configured to fix the battery and the PCB board, and
   a bottom of the base is provided with a bottom cover connected by a bayonet.

3. The telescopic multifunctional mosquito killing lamp according to claim 1, wherein the PCB board is provided with a microcontroller, a TYPE-C charging port, a button, and an indicator light.

4. The telescopic multifunctional mosquito killing lamp according to claim 1, wherein the one end of the telescopic rod that is located at the lamp is provided with a T-shaped swivel head, and the T-shaped swivel head is rotatably connected to a lampshade of the lamp;
   the lampshade is provided with a second through groove configured to accommodate the telescopic rod,
   a top of the lampshade is further clamped with a top cover.

5. The telescopic multifunctional mosquito killing lamp according to claim 4, wherein two sides of the T-shaped swivel head are provided with two first through grooves configured for power supply lines to pass through,
   the first through grooves fix the power supply lines through a pressing piece,
   the T-shaped swivel head abuts against a shaft hole of the lampshade through a fixing piece.

6. The telescopic multifunctional mosquito killing lamp according to claim 1, wherein a wavelength range of a UVA band of the UV light source is 320-400 nanometers.

7. The telescopic multifunctional mosquito killing lamp according to claim 1, wherein the base is further provided with a photosensitive sensor, and the photosensitive sensor is electrically connected to the PCB board.

* * * * *